(12) United States Patent
Shibutani

(10) Patent No.: US 7,098,943 B2
(45) Date of Patent: Aug. 29, 2006

(54) SHOOTING CONDITION PROVIDING APPARATUS, SHOOTING CONDITION SETTING SYSTEM, AND SHOOTING CONDITION PROVIDING METHOD

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 705 days.

(21) Appl. No.: 09/945,863

(22) Filed: Sep. 4, 2001

(65) Prior Publication Data

US 2002/0030746 A1  Mar. 14, 2002

(30) Foreign Application Priority Data

Sep. 8, 2000  (JP) .............................. 2000-272536
Aug. 3, 2001  (JP) .............................. 2001-235694

(51) Int. Cl.
  *H04N 5/232*  (2006.01)
  *H04N 5/225*  (2006.01)
  *H04N 5/222*  (2006.01)

(52) U.S. Cl. .............................. 348/211.1; 348/207.11; 348/231.3; 348/333.01

(58) Field of Classification Search ............. 348/211.1, 348/211.4, 211.3, 211.9, 211.13, 211.14, 348/207.1, 207.11, 222.1, 589, 552, 333.01, 348/231.2; 396/57

See application file for complete search history.

(56) References Cited

U.S. PATENT DOCUMENTS

| | | | | |
|---|---|---|---|---|
| 5,845,166 | A * | 12/1998 | Fellegara et al. | 396/429 |
| 6,006,039 | A * | 12/1999 | Steinberg et al. | 396/57 |
| 6,035,323 | A * | 3/2000 | Narayen et al. | 709/201 |
| 6,046,769 | A * | 4/2000 | Ikeda et al. | 348/222.1 |
| 6,201,571 | B1 * | 3/2001 | Ota | 348/239 |
| 6,459,388 | B1 * | 10/2002 | Baron | 340/996 |
| 6,535,243 | B1 * | 3/2003 | Tullis | 348/207.1 |
| 6,538,686 | B1 * | 3/2003 | Hara et al. | 348/14.12 |
| 6,642,958 | B1 * | 11/2003 | Watanabe et al. | 348/552 |

FOREIGN PATENT DOCUMENTS

| | | |
|---|---|---|
| CN | 1171580 A | 1/1998 |
| EP | 0 805 418 A | 11/1997 |
| EP | 0 838 939 A | 4/1998 |
| EP | 0 949 805 A | 10/1999 |

(Continued)

OTHER PUBLICATIONS

Patent Abstracts of Japan, vol. 1999, No. 12, Oct. 29, 1999 & JP 11 191858 A (Canon Inc), Jul. 13, 1999 abstract.

*Primary Examiner*—Lin Ye
(74) *Attorney, Agent, or Firm*—Frishauf, Holtz, Goodman & Chick, P.C.

(57) ABSTRACT

Anyone using a camera device can set proper shooting conditions according to shooting result while imaging the shooting result. A plurality of sample images and shooting condition data such as shutter speed of each sample image or diaphragm value are stored in a data file of an image server. A personal computer browses images that the image server has, and download a required image (during downloading, the image server adds shooting condition data to the required image data, and generates a sample transmission image. The personal computer stores the received sample image, transmits the image to the user's camera, and records it.). The camera sets the same shooting conditions as those during shooting of the sample image based on the shooting condition data added to the sample image when predetermined key operation is made while the sample image is displayed.

7 Claims, 20 Drawing Sheets

FOREIGN PATENT DOCUMENTS

| | | |
|---|---|---|
| EP | 1033678 A1 * | 9/2000 |
| JP | 05-260364 A | 10/1993 |
| JP | 06-245121 A | 9/1994 |
| JP | 07-306933 A | 11/1995 |
| JP | 08-315106 A | 11/1996 |
| JP | 10070641 A * | 3/1998 |
| JP | 10084541 A * | 3/1998 |
| JP | 10-164554 A | 6/1998 |
| JP | 11-239284 A | 8/1999 |
| JP | 2000-165736 A | 6/2000 |

* cited by examiner

FIG.4

| DEVICE TYPE NAME | TRANSMISSION IMAGE SIZE |
|---|---|
| AAA | |
| BBB | |
| CCC | |
| | |

| DEVICE TYPE NAME (23a) | IMAGE DATA (23b) | SHOOTING CONDITION DATA (23c) | REDUCTION IMAGE DATA (23d) |
|---|---|---|---|
| AAA | ⋮ | ⋮ | ⋮ |
| BBB | ⋮ | ⋮ | ⋮ |
| CCC | ⋮ | ⋮ | ⋮ |
| DDD | ⋮ | ⋮ | ⋮ |

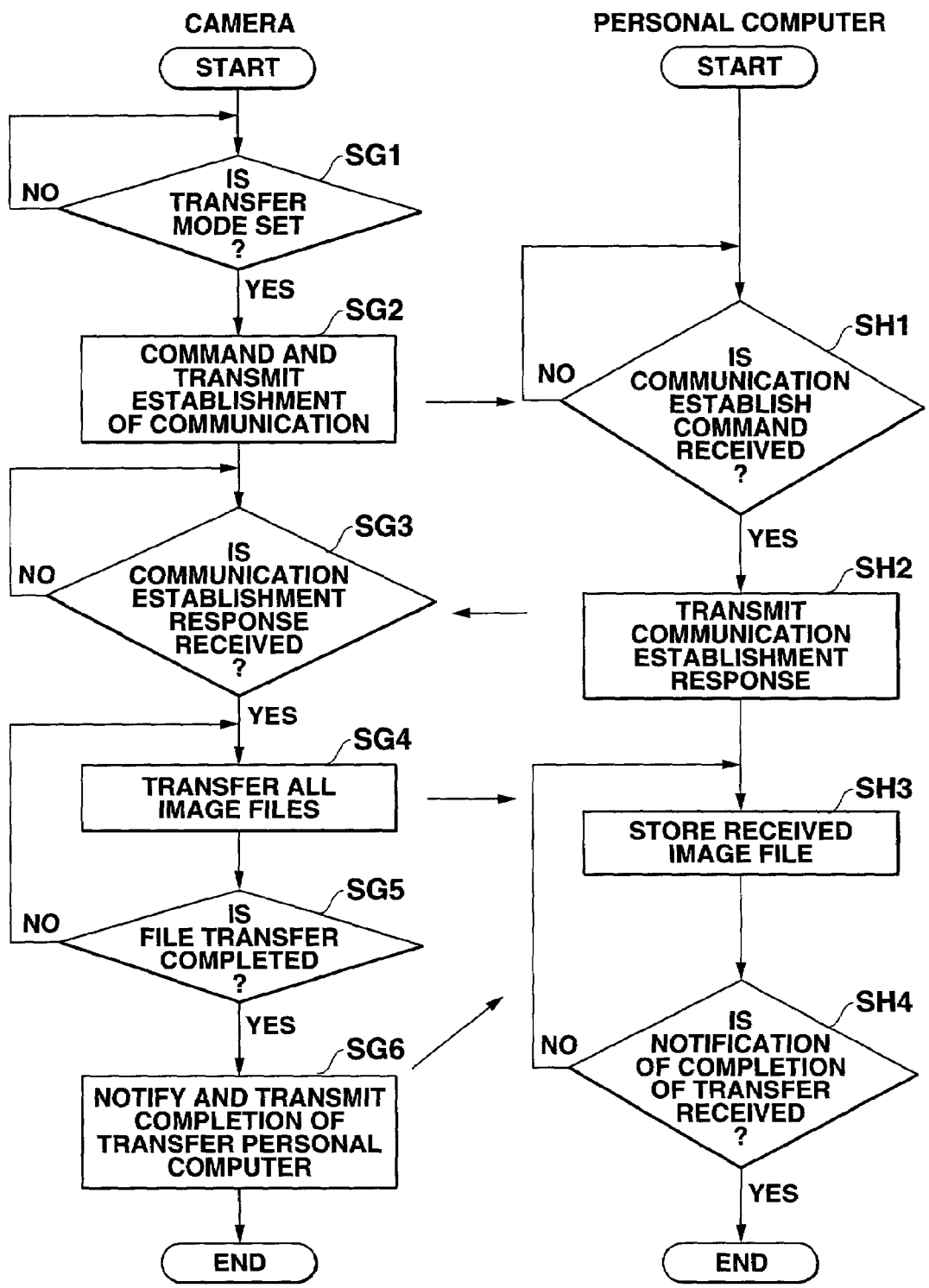

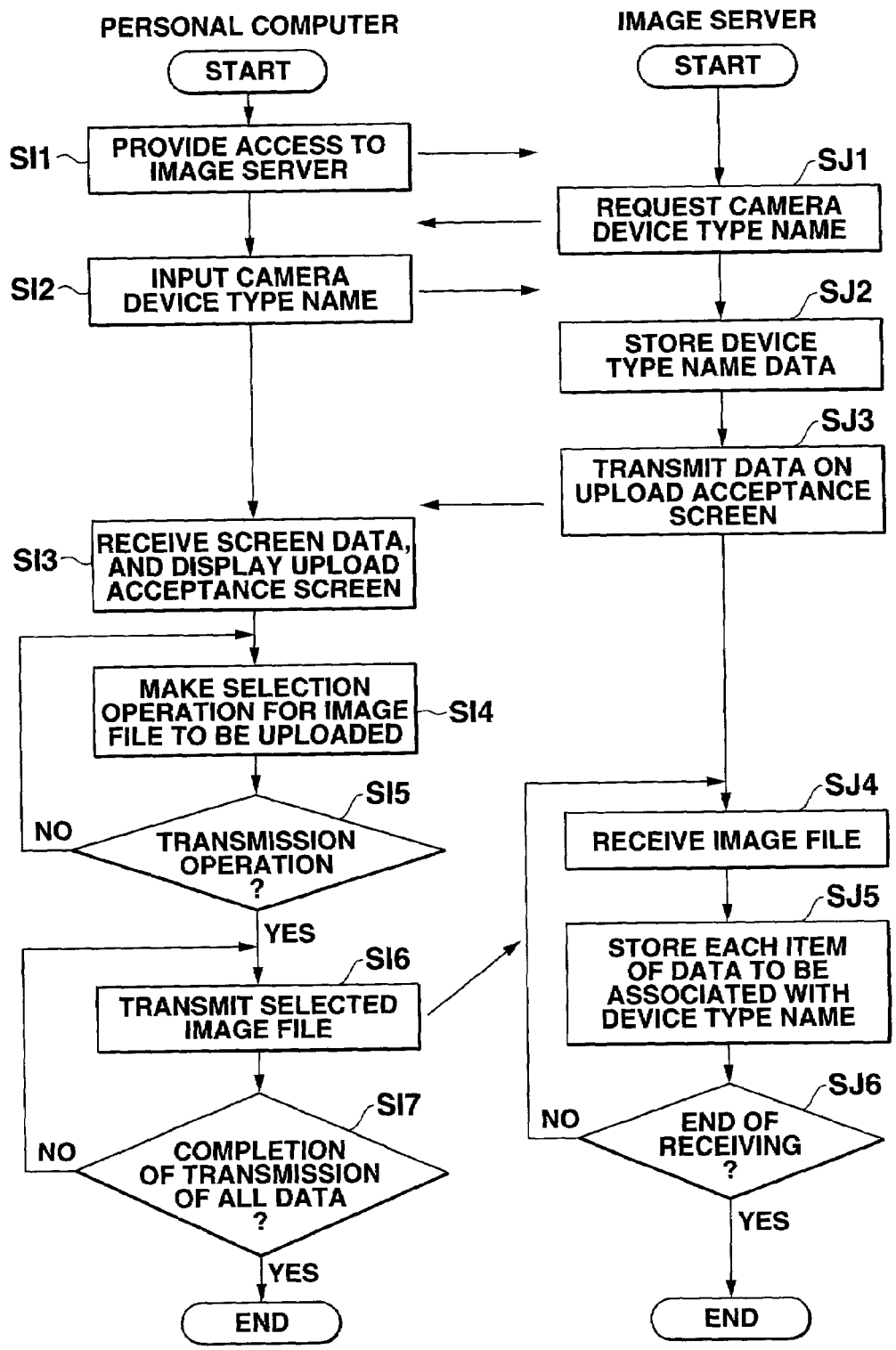

SHOOTING CONDITION PROVIDING APPARATUS, SHOOTING CONDITION SETTING SYSTEM, AND SHOOTING CONDITION PROVIDING METHOD

CROSS-REFERENCE TO RELATED APPLICATIONS

This application is based upon and claims the benefit of priority from the prior Japanese Patent Applications No. 2000-272536, filed Sep. 8, 2000; and No. 2001-235694, filed Aug. 3, 2001, the entire contents of both of which are incorporated herein by reference.

BACKGROUND OF THE INVENTION

1. Field of the Invention

Conventionally, in an electronic still camera, for example, it is general that a variety of shooting conditions at the apparatus side such as shutter speed or collimator value are automatically set by selecting a shooting mode provided in advance.

2. Description of the Related Art

In addition, in recent years, shooting conditions such as shutter speed can be manually set according to an operator's preference, and the contents of the set shooting conditions are preset, whereby the same shooting conditions can be set during next shooting.

However, even if the operator can set the shooting conditions manually according to one's preference, as described above or even if it is possible to reuse the shooting conditions preset in advance, the contents of setting the shooting conditions are numeric values or technical terms, and thus, the result of shooting under the conditions of setting cannot be easily imaged.

Because of this, for a general operator, it is difficult to set shooting conditions for the shooting result that is coincident with an image while the operator images the shooting result, i.e., shot image.

Therefore, there has been a problem that it is impossible to know whether or not the set shooting conditions are coincident with an image until actual shooting has been carried out.

SUMMARY OF THE INVENTION

According to one aspect of the present invention, a camera apparatus is provided which includes: a shooting condition receiving terminal including a transmitting section configured to transmit camera type information to a shooting condition providing unit, and a receiving section configured to receive reduced images and shooting condition setting information specified in accordance with the camera type information and transmitted from the shooting condition providing unit; and a camera device main body which is capable of communicating with the shooting condition receiving terminal, and which is configured to shoot and record object images. The camera device main body includes: a terminal side storage section configured to store the reduced images and the shooting condition setting information received via the shooting condition receiving terminal; a display section configured to display the reduced images stored in the terminal side storage section; and a setting section configured to set shooting conditions during shooting based on the shooting condition setting information stored in the terminal side storage section.

According to another aspect of the present invention, a shooting condition providing apparatus is provided which includes a storage section configured to store captured images that are reduced to a predetermined size and shooting condition setting information indicating shooting conditions corresponding to the reduced images. A receiving section is configured to receive camera type information from a camera device, so as to specify images which correspond to the camera type information among the plurality of reduced images stored in the storage section. An information adding section is configured to add the corresponding shooting condition setting information stored in the storage section to the specified reduced images. And a transmission section is configured to transmit the reduced images having the shooting condition setting information added thereto to the camera device.

According to a further aspect of the present invention, a shooting condition setting system is provided which includes a shooting condition providing unit, and a camera device. The shooting condition providing unit includes: a storage section configured to store captured images that are reduced to a predetermined size and shooting condition setting information indicating shooting conditions corresponding to the reduced images; a receiving section configured to receive camera type information from a camera device, so as to specify images which correspond to the camera type information among the plurality of reduced images stored in the storage section; an information adding section configured to add the corresponding shooting condition setting information stored in the storage section to the specified reduced images; and a transmission section configured to transmit the reduced images having the shooting condition setting information added thereto to the camera device. The camera device includes a transmitting section configured to transmit the camera type information to the shooting condition providing unit; a receiving section configured to receive from the shooting condition providing unit the reduced images having the shooting condition setting information added thereto; a terminal side storage section configured to store the received reduced images having the shooting condition setting information added thereto; a display section configured to display the reduced images stored in the terminal side storage section; and a setting section configured to set the shooting conditions during shooting based on the shooting condition setting information stored in the terminal side storage section, in accordance with a user request.

According to the present invention, an accounting processing section may be provided which is configured to carry out accounting processing for a user of the camera device, as the transmission section transmits the reduced images having the shooting condition setting information attached thereto to the camera device.

In addition, according to the present invention the images stored in the storage section include images uploaded by the camera device.

BRIEF DESCRIPTION OF THE SEVERAL VIEWS OF THE DRAWING

FIG. 4 is a conceptual view showing a configuration of a set file;

FIG. 14 is a conceptual view showing a configuration of an image data file according to the second embodiment of the present invention;

FIG. 19 is a flow chart showing an operation concerning data transfer between an electronic still camera and a personal computer according to the third embodiment of the present invention; and FIG. 20 is a flow chart showing an operation concerning uploading of an image file from a personal computer to an image server according to the third embodiment of the present invention.

DETAILED DESCRIPTION OF THE INVENTION

Hereinafter, one embodiment of the present invention will be described with reference to the accompanying drawings.

FIRST EMBODIMENT

Figure 1:
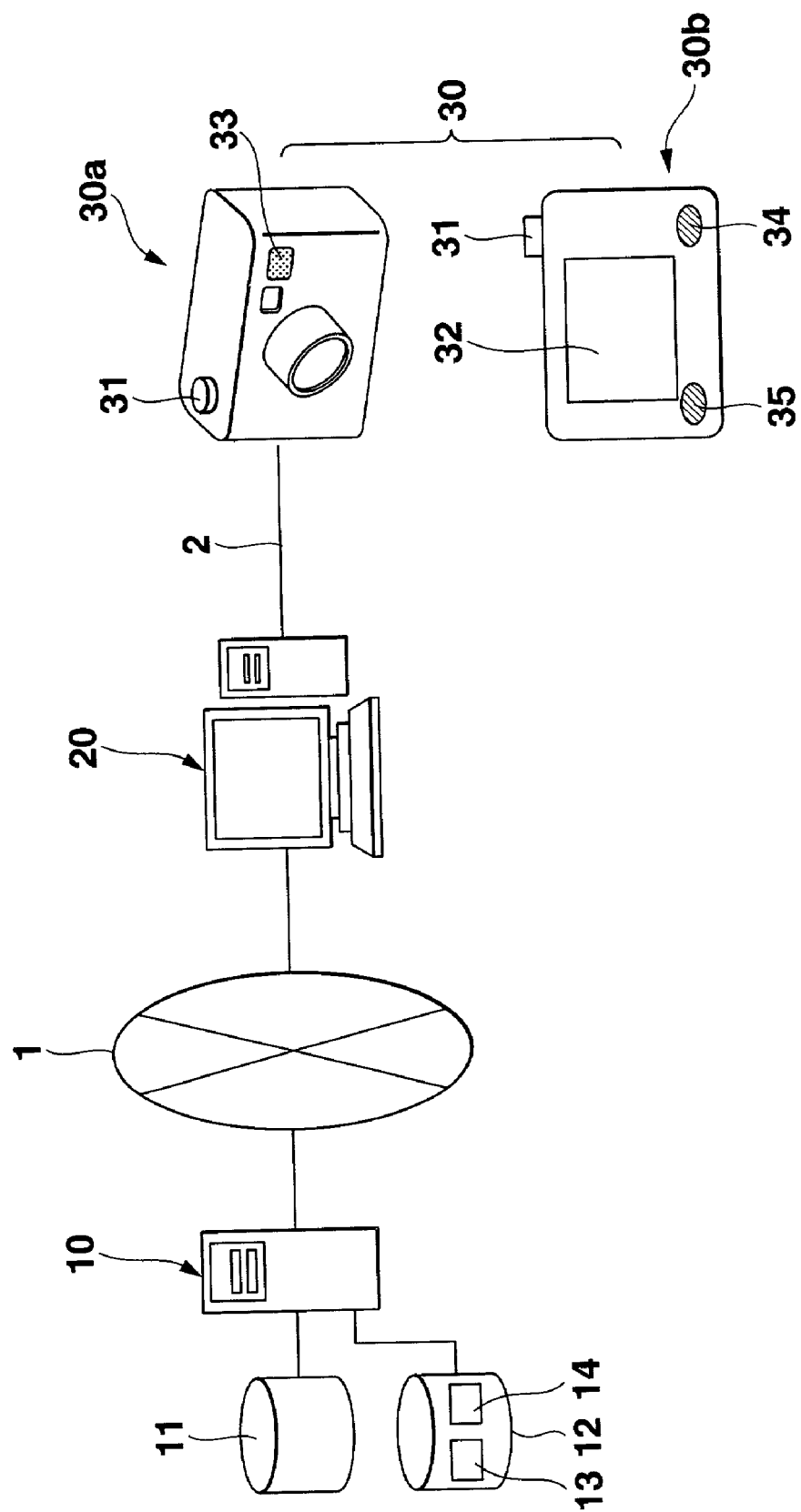
FIG. 1 is a system configuration diagram showing a first embodiment of the present invention.

FIG. 1 is a configuration diagram of a shooting condition setting system according to a first embodiment of the present invention. This system comprises: an image server 10 connected via an existing network 1 such as public line network or Internet; a general-purpose personal computer 20; and an electronic still camera 30 interconnected to the personal computer 20 via a cable 2 (for example, predetermined link cable or UBS cable).

Figure 2:
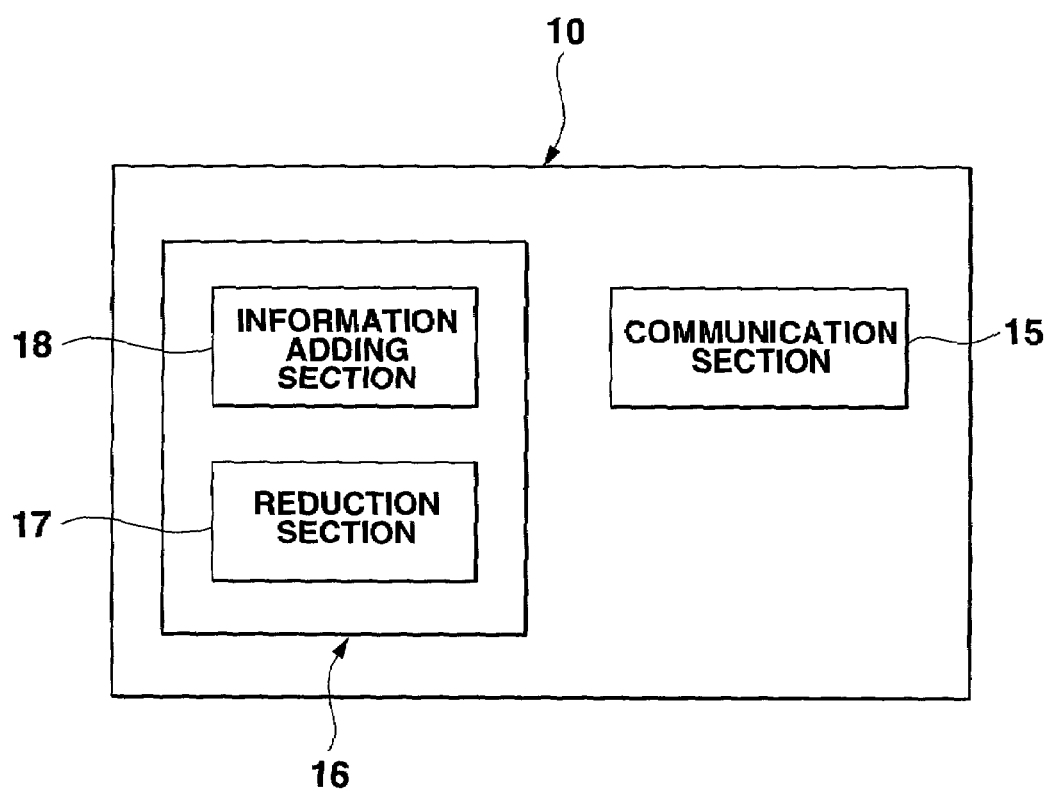
FIG. 2 is a block diagram depicting an internal function of an image server.

The image server 10 is a shooting condition providing apparatus of the present invention. This server comprises: a program file 11 and a data file 12 having a communication function, a file transfer function and the like in accordance with predetermined protocols and storing programs for achieving functions; a server control section 16 for controlling the apparatus based on the programs, as shown in FIG. 2; and a communication section 15 enabling communication with another device via the network 1. The server control section 16 comprises a reduction section 17 for reducing an image according to device type; and an information adding section 18 for adding shooting condition data to image data.

The data file 12 is a storage section in the image server 10. This data file is actually a predetermined storage region of a storage section such as hard disk, and is composed of an image data file 13 shown in FIG. 3 and a set file 14 shown in FIG. 4.

Figure 3:
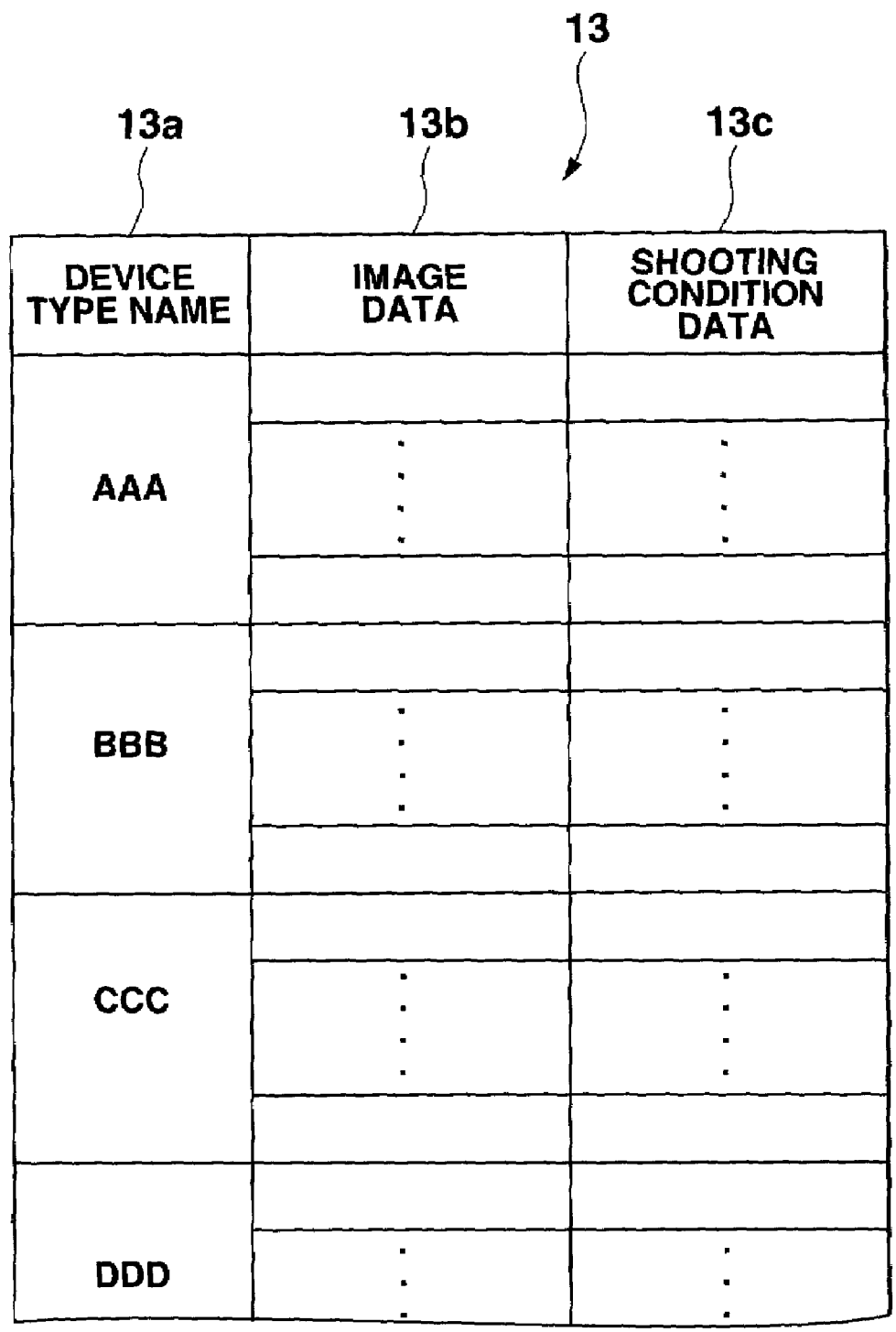
FIG. 3 is a conceptual view showing a configuration of an image data file.

The image data file 13, as shown in FIG. 3, is composed of: a device type name data 13a for specifying an electronic still camera (for example, device type name consisting of alphanumeric letters or the like); image data 13b of a plurality of images shot in advance by using the electronic still camera; and shooting condition data 13c indicating the conditions of setting the shooting conditions set in the electronic still camera during shooting of each of these images. The image data 13b may be general image data compressed in accordance with a JPEG scheme or the like or may be image data available for use in a specific electronic still camera.

More specifically, the shooting condition data 13c are shooting condition setting parameters in the electronic still camera. The setting parameters are, for example, shown below although these parameters differ depending on electronic still camera type. That is, a variety of setting parameters include: whether or not to use auto focus function; focus length (such as ∞ or macro); shutter speed; collimator value; EV shift value caused by exposure control function; type of exposure control function (usually, scene at night); light measuring scheme (such as center emphasized or multiple); type of light source defined as a reference using auto white balance function (such as solar light or fluorescent light); type of color emphasized by color adjustment function; whether or not to carry out sharpness processing caused by image quality adjustment function; and degree of sharpness if such processing is carried out.

In addition, the set file 14, as shown in FIG. 4, is composed of device type name data 14a for specifying an electronic still camera and transmission image size data 14b indicating an image size suitable to image display capacity in electronic still camera of each type. The image size suitable to image display capacity in the electronic still camera of each type denotes an image size (resolution) that each electronic still camera can display in its state. The image size may be a maximum image size (for example, 800×600 pixels), may be a preview image size whose size is smaller than the maximum size (for example, 800×600 pixels), or may be thumb nail image size (for example, 320×240 pixels) whose size is further smaller than the preview size.

Figure 5:
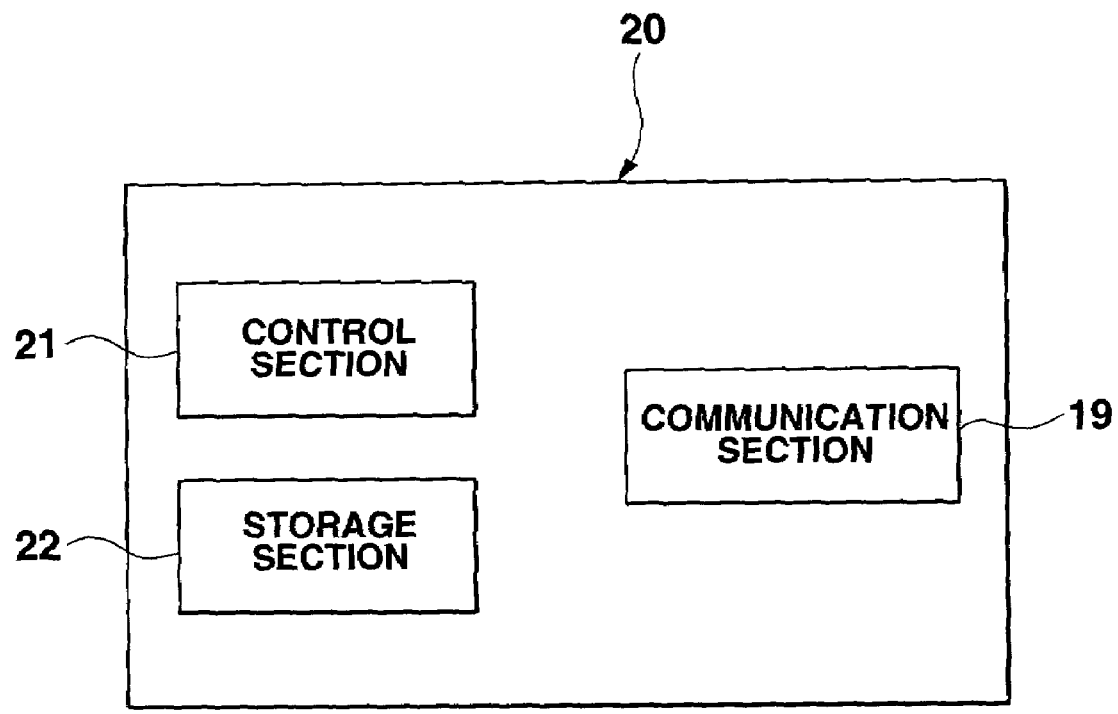
FIG. 5 is a block diagram depicting an internal function of a personal computer.

The personal computer 20 comprises a shooting condition receiving terminal of the present invention. As shown in FIG. 5, this personal computer includes: a communication section 19 such as modem for carrying out communication or file downloading in accordance with predetermined protocols between the control section 2 for carrying out control of the personal computer 20 and the image server 10; and a storage section 22 such as hard disk. The storage section 22 stores a communication program or predetermined link programs for exchanging image data or the like with the electronic still camera 30. The personal computer 20 that is a shooting condition receiving terminal may be installed at a place other than at home, for example, at a convenience store or at any other shop where the electronic still camera 30 is commercially available for sale.

The electronic still camera 30 is a camera device main body that configures a camera device of the present invention together with the personal computer 20. In FIG. 1, reference numeral 30a is a diagonal front view, and reference numeral 30b is a rear view. Reference numeral 31 denotes a shutter key; reference numeral 32 denotes a TFT type liquid crystal monitor; reference numeral 33 denotes a strobe; reference numeral 34 denotes a mode switch key used for variety of operating modes; and reference numeral 35 denotes "+" and "−" keys used for a variety of setting operations.

Figure 6:
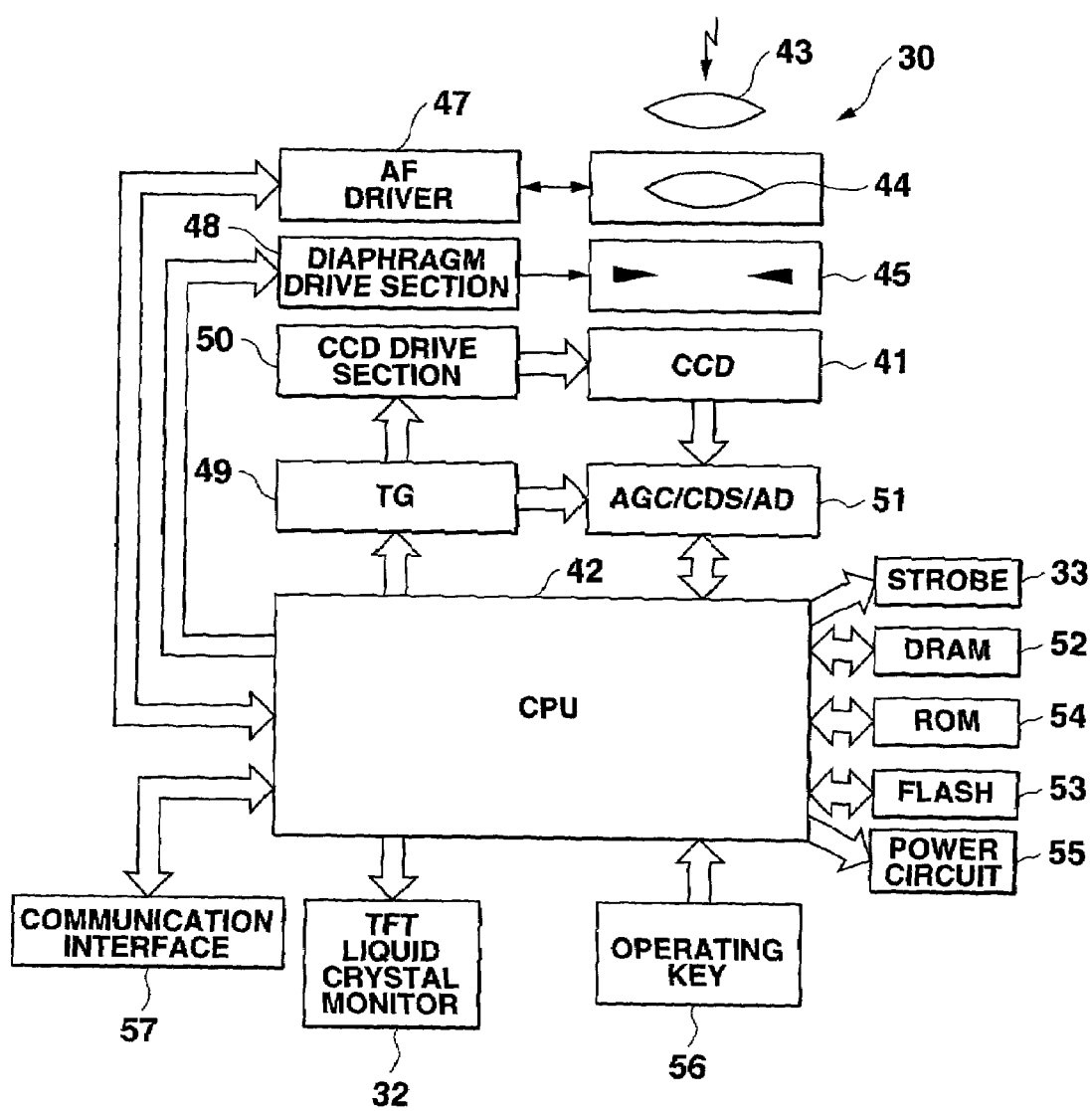
FIG. 6 is a block diagram depicting an electronic still camera.
Figure 7:
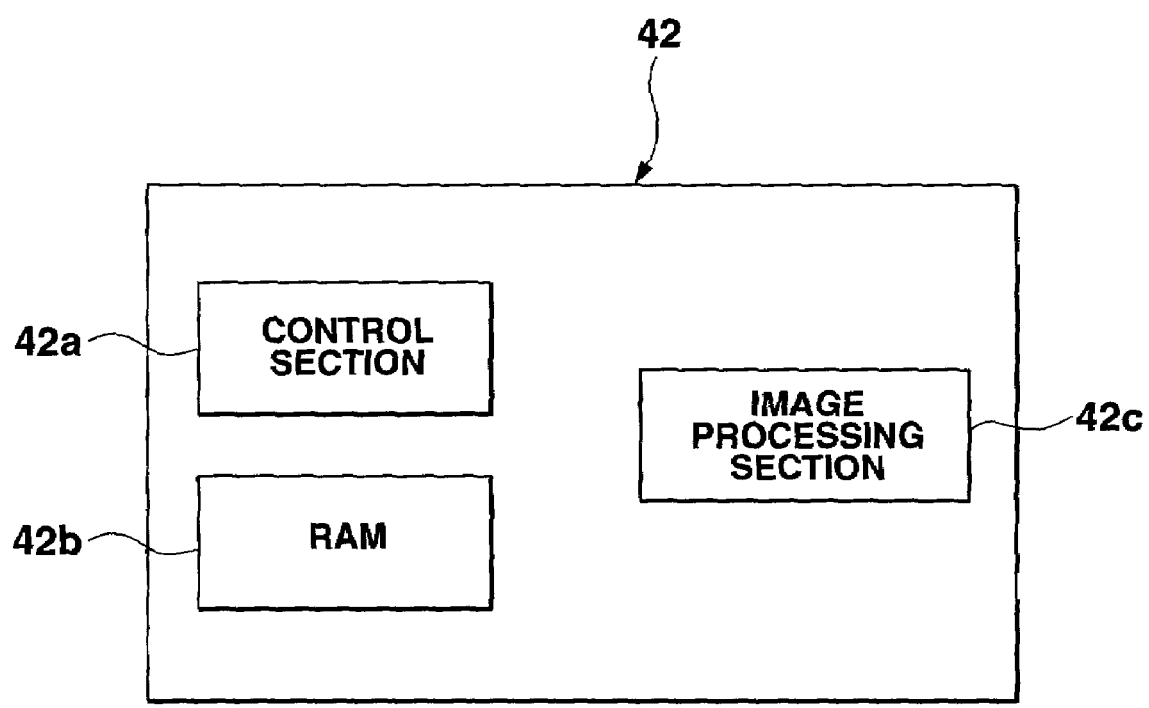
FIG. 7 is a block diagram depicting an internal function of a CPU 42.

FIG. 6 is a schematic block diagram depicting an electrical configuration of an electronic still camera 30. The electronic still camera 30 primarily comprises an image processing section 42c having an image processing function for converting the image shot by a CCD 41 that is a charged coupled device into encode data based on predetermined standards such as JPEG; and a CPU 42 having a control section 42a for controlling the CPU 42 and a RAM 42b that functions as a working memory. FIG. 7 is a functional block diagram depicting the inside of the CPU 42.

On the light receiving face of the CCD 41, an optical image of an object is formed through a fixed lens 43, a focus lens 44, and a collimator 45. The focus lens 44 is held on a drive mechanism 46 composed of an AF motor or the like, and a drive signal outputted by an AF driver 47 based on a control signal from the CPU 42 is supplied to the drive mechanism 46, thereby moving the drive mechanism forward and backward on an optic axis. The collimator 45 is driven by means of a drive signal generated by a drive section 48 based on the control signal from the CPU 42, and adjusts the light quantity of an object image incident to the CCD 41.

In addition, a TG (Timing Generator) 49 for generating a timing signal is connected to the CPU 42, and a CCD drive section 50 (vertical direction driver) drives the CCD 41 based on the timing signal generated by the TG 49. Concurrently, an analog image shooting signal according to the luminance of an object image is outputted by means of the CCD 41, and the outputted signal is delivered to a unit section 51. The unit section 51 comprises: a CDS for holding an image shooting signal outputted from the CCD 41; a gain control amplifier (AGC) that is an analog amplifier to which the shooting signal is supplied from the CDS; and an A/D converter (AD) for converting the image shooting signal amplified and controlled by the gain control amplifier into image data. An output signal of the CCD 41 is sampled by adjusting a black level, and the sampled digital signal is delivered to the CPU 42. The delivered digital signal (image shooting signal) is temporarily stored in a DRAM 52, and a variety of image processing operations are applied to the signal by means of the CPU 42. Finally, an image file consisting of compressed video image signal is stored in a removable flash memory (FLASH) 53.

Figure 8:
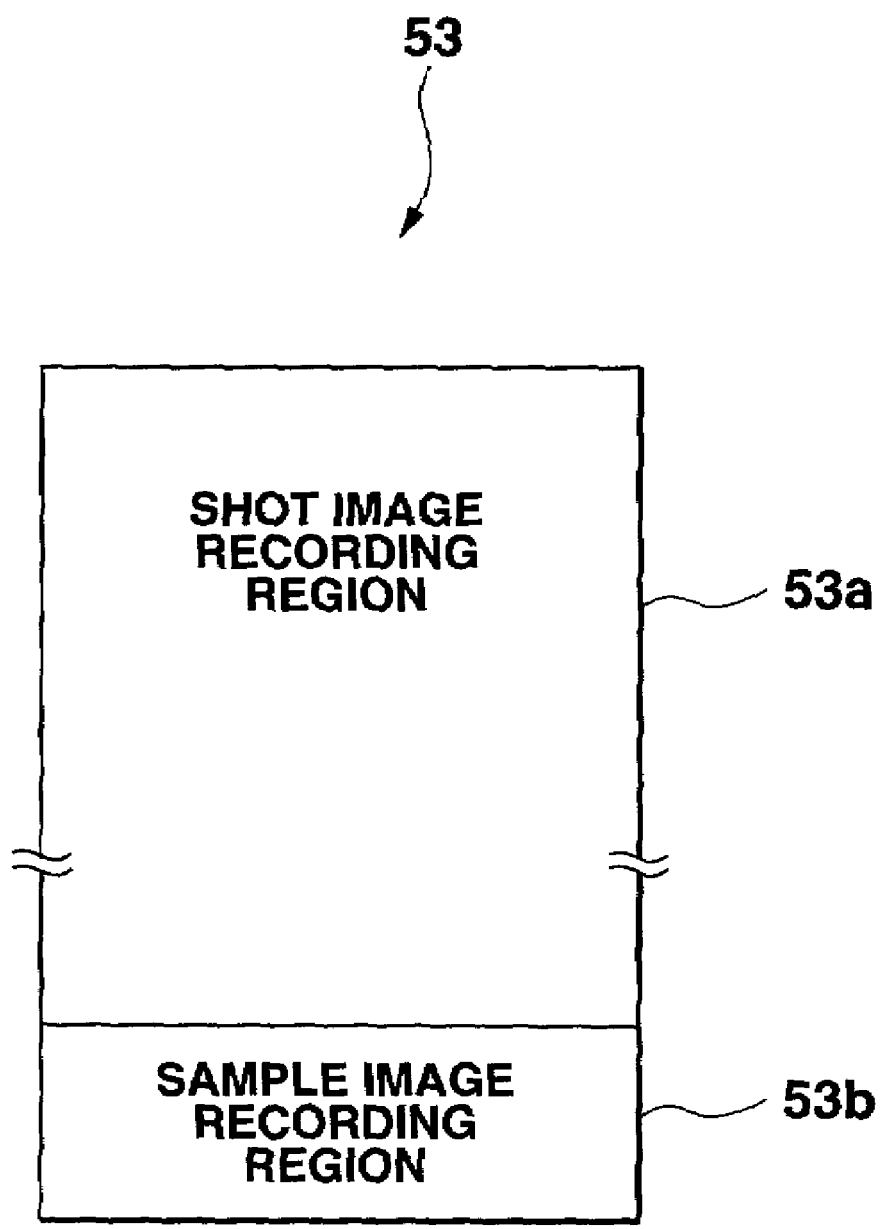
FIG. 8 is a conceptual view showing a data recording region of a flash memory.

The flash memory 53 is a terminal side storage section of the present invention. As shown in FIG. 8, in the flash memory 53, a shot image recording region 53a for recording compressed image data after shot from the CCD 41 together with shooting operation and a sample image recording region 53b having recorded therein sample image data 140 described later are allocated.

Further, to the CPU 42, there are connected a ROM 54, a power circuit 55, an operating key section 56 including a variety of switches shown in FIG. 1; the TFT liquid crystal monitor 32; the strobe 33; and a communication interface 57. The ROM 54 is a program ROM having an operating program of the CPU 42 recorded therein. The ROM 54 stores various data such as program AE data configuring a program diagram that shows a combination between the collimator value (F) and shutter speed that correspond to proper exposure value (EV) during image shooting. The CPU 42 functions as a setting section of the present invention by operating the built-in RAM 42b as a working memory in accordance with the operating program. In addition, the CPU 42 provides gain settings or the like such as charge accumulation time of CCD 41 in accordance with the program diagram; degree of opening of the collimator 45; or gain control amplifier (AGC) gain settings of the unit section 51. The charge accumulation time set by the CPU 42 is supplied as a shutter pulse to the CCD drive section 50 via the TG 49. In accordance with the setting, the CCD drive section 50 drives the CCD 41, whereby the charge accumulation time, i.e., exposure time (shutter speed) is controlled. In addition, the operating program stored in the ROM 54 includes a program concerning auto focus control, and the CPU 42 drives the focus lens 46, and carries out focusing based on such program.

The program data or the like stored in the ROM 54 may be fixedly provided if the contents of recording can be held or may be recorded in another recording medium such as removably mountable IC card. The program data or the like may be supplied from another device such as personal computer.

The TFT liquid crystal monitor 32 displays serially shot images in an image recording mode as a through image, and displays a video image in a reproduction mode based on an analog video signal generated from image data recorded in the flash memory 53. The strobe 33 is driven as required during shooting operation when the shutter key 31 is pressed, and emits auxiliary light. The communication interface 57 has a connector to which the cable 2 is connected, and the CPU 42 makes data communication with the personal computer 20 via the communication interface 57.

Figure 12:
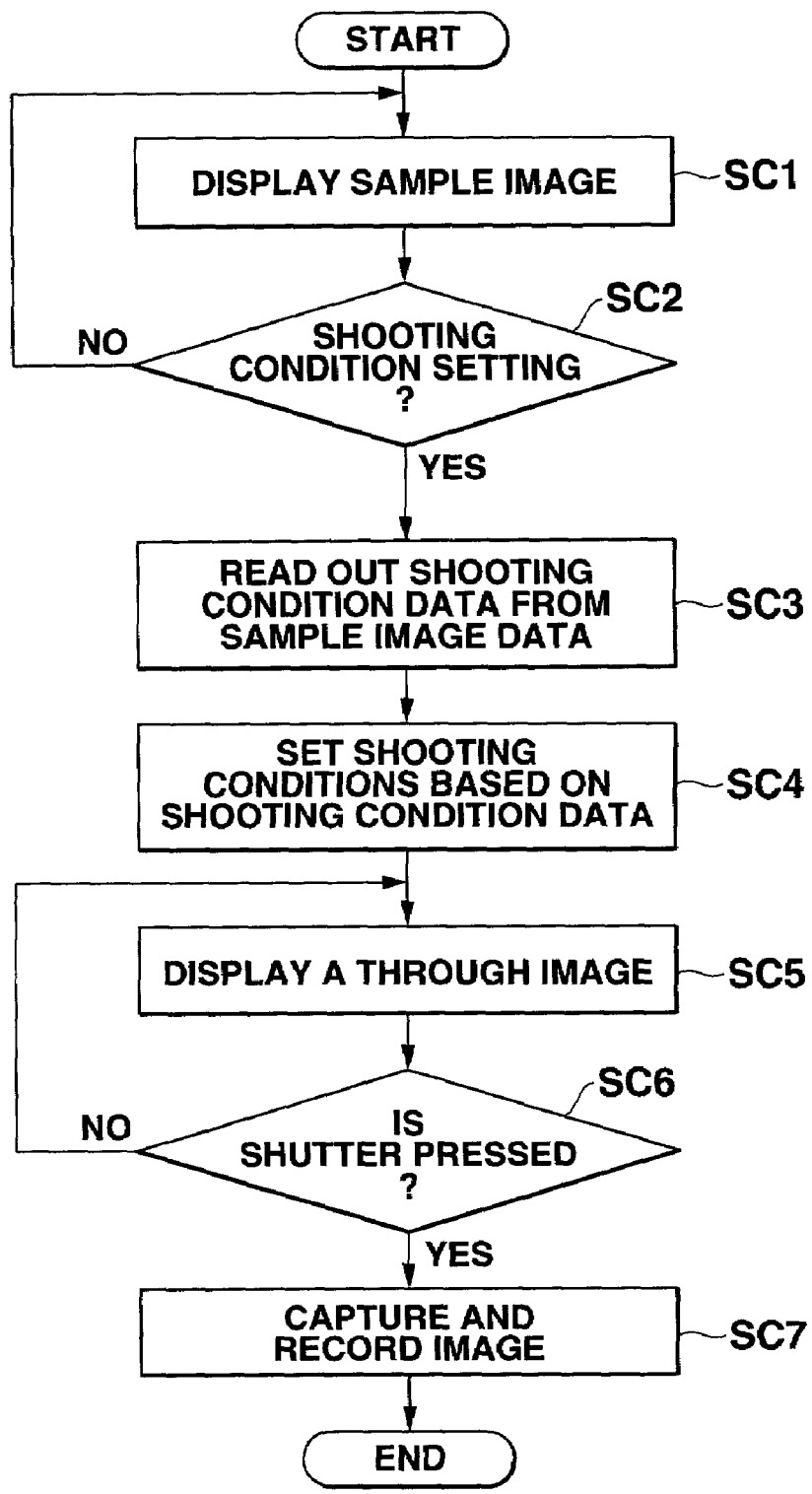
FIG. 12 is a flow chart showing an operation of an electronic still camera.

Now, an operation of each device when a user of an electronic still camera 30 sets the shooting conditions of the electronic still camera 30 by using data shot from an image server 10 via a personal computer 20 will be described in accordance with a flow chart shown in FIG. 9 and FIG. 12. Here, a case in which the network 1 is Internet will be described.

<Operation of Personal Computer and Image Server>

Figure 9:
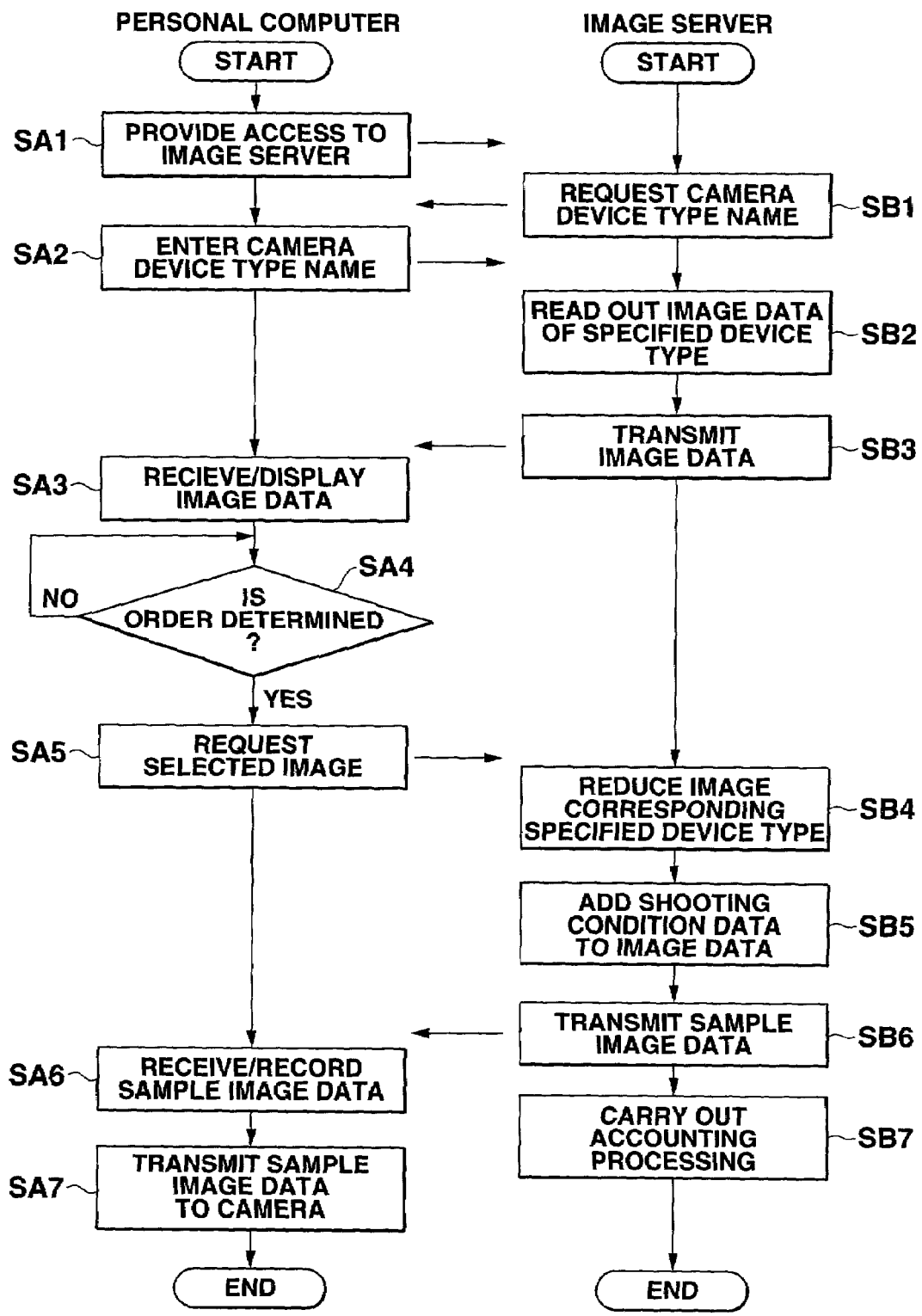
FIG. 9 is a flow chart showing an operation of a personal computer and an image server.

That is, as shown in FIG. 9, when a personal computer 20 provides an access to an image server 10 (such as a download site of image data) with the user operation (step SA1), the image server 10 requests a camera type name (step SB1). The personal computer 20 prompts the user to enter a device type name, and transmits the entered device type name to the image server 10 (step SA2). Although the user inputted device type name data is transmitted to the image server 10, for example, at the step SB1, the image server 10 transmits all device type name data 14a registered in the previously described set file 14 to the personal computer 20, and the personal computer 20 displays the screen such as device type name list, and causes the user to select any device type name so that the selected device type name data may be transmitted to the image server 10.

Figure 10:
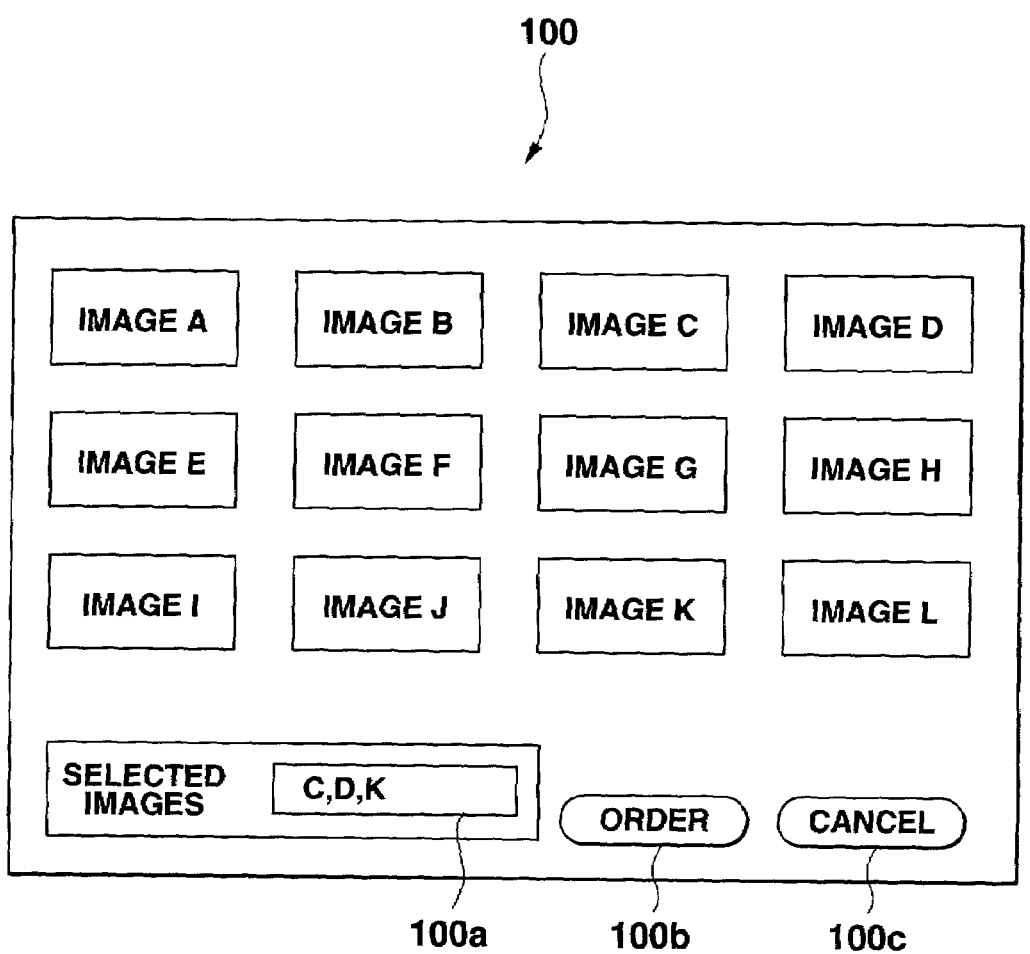
FIG. 10 is a view showing an example of an image ordering screen.

Then, the image server 10 reads a plurality of image data 13b stored in advance in an image data file 13 (step SB2), these items of data are transmitted to the personal computer 20 (step SB3). In addition, at this time, a plurality of image data transmitted by the image server 10 to the personal computer 20 may be reduced image data 13b because the device type name is identified. A small data capacity will suffice, and thus, a short transfer time and a small receiving memory space will suffice. For example, this reduced image data is effective in the case where the capacity of a memory such as electronic still camera 30 having a communication function is limited. The personal computer 20 displays on the screen an image based on each item of received image data 13b (step SA3). At this time, on the screen, for example, as shown in FIG. 10, a predetermined image order screen 100 having displayed thereon an input box 100a for a selected image, an order button 100b, and a cancel button 100c is displayed together with a plurality of images A to L based on each item of the received image data 13b. When the user select one or plural images, and clicks the order button 100b (YES at step SA4), the personal computer 20 transmits to the image server 10 specific information such as image number or data name specifying the selected images, and requests the image (step SA5). In the case where the user clicks the cancel button 100c instead of the order button 100b, processing for returning to the step SA2 or the like is carried out.

Figure 11:
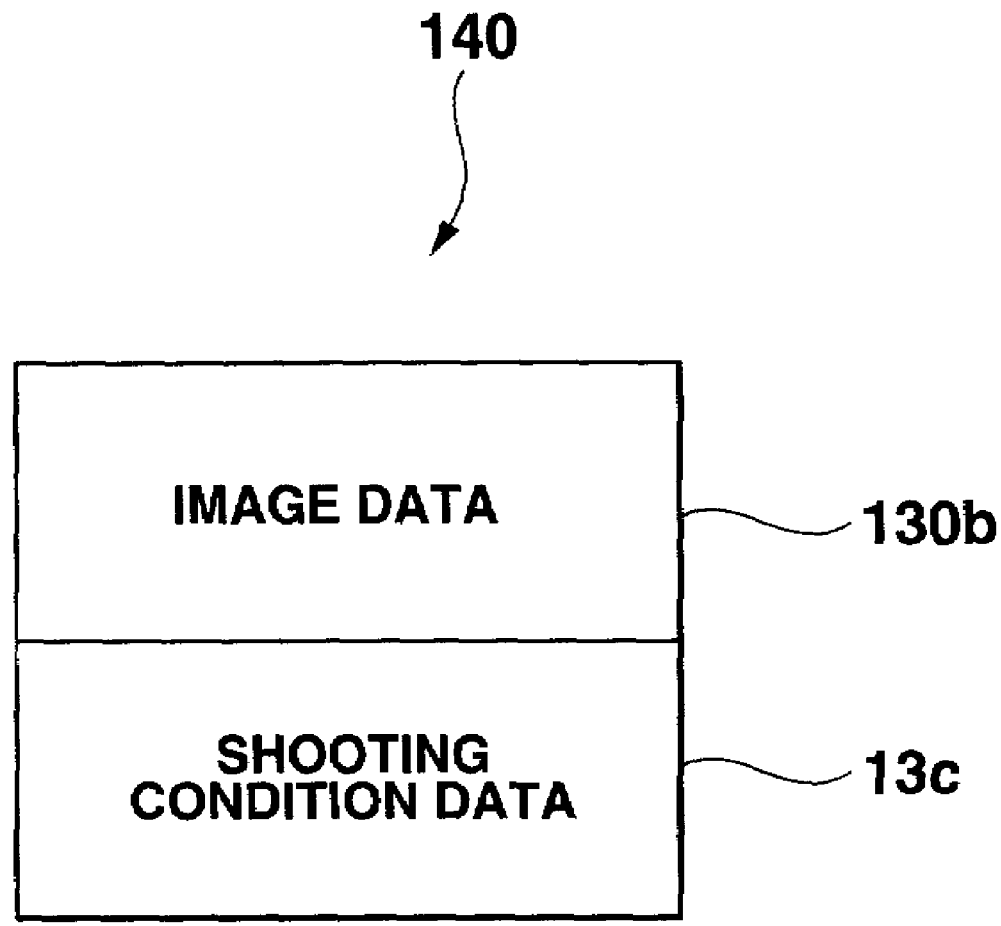
FIG. 11 is a conceptual view showing a configuration of sample image data.

Next, the image server 10 carries out processing for reducing the image size to an image size that corresponds to the specified device type name stored in a set file 14 and shot at the step SB1 (step SB4). Further, the shooting condition data 13c stored in advance in the image data file 13 added corresponding to the image data is added to image data 13b after processing, and sample image data 140 that is transmission image data of the present invention, the data comprising image data 130b after reduced and shooting condition data 13c, is generated as shown in FIG. 11 (step SB5). In FIG. 11, although the sample image data 140 is conceptually shown, in the case where the sample image data 140 is defined as an image file in a JPEG scheme, for example, the image data 130b (encode data) after reduced is stored in an image data region of the image file, and the shooting condition data 13c is stored in a region in which a predetermined user can use freely. Next, immediately after one or plural items of generated sample image data 140 has been transmitted to the personal computer 20 (step SB6), predetermined accounting processing is carried out for the user of the personal computer 20 (step SB7).

The personal computer 20 receives the sample image data 140 from the image server 10, and stores the data in a hard disk (step SA6). Then, the user initiates previously described link program, and carries out a predetermined transmission operation, whereby the sample image data 140 stored in the hard disk is transmitted to the electronic still camera 30 (step SA7). In this manner, one or plural items of sample image data 140 downloaded from the image server 10 is recorded in the sample image recording region 53b allocated in a flash memory 53 of the electronic still camera 30 in accordance with the previously described procedure.

<Operation of Electronic Still Camera>

Now, an operation of an electronic still camera 30 in which, after sample image data 140 has received from a personal computer 20, and the received sample image data 140 is recorded in a flash memory 53, will be described with reference to FIG. 12.

The figure is a flow chart showing an example of operation when a shooting condition setting mode is selected based on a sample image provided in advance in an electronic still camera 30, where, when the set mode is selected, the electronic still camera 30 displays on a TFT liquid crystal monitor 32 a sample image recorded in a sample image recording region 53b of a flash memory 53 (step SC1). In addition, at this time, in the case where a plurality of sample images are recorded in the flash memory 53, the plurality of sample images are serially reproduced in predetermined order (or in reverse order) according to the user operation of the "+" and "−" keys 35, and are displayed on the TFT liquid crystal monitor 32.

When the user instructs shooting condition setting by key operation while such any sample image is displayed (YES at the step SC2), the shooting condition data 13c added to sample image data (sample image data 140) displayed at this time is read out (step SC3). Then, a variety of shooting conditions indicated by the read out shooting condition data 13c are set (step SC4), processing goes to a REC (record) mode that is a shooting standby state, and a through image is displayed on the TFT liquid crystal monitor 32 (step SC5). Thereafter, when a shutter key 31 is pressed (YES at the step SC6), an image is captured from a CCD 41, and the captured image is compressed. In addition, the compressed, shot image data is recorded in a shot image recording region 53a of the flash memory 53, and shooting is completed (step SC7).

In this manner, the user of the electronic still camera 30, i.e., the operator can set the same shooting conditions as that during shooting of sample image at the electronic still camera 30 while reviewing an image from the sample image shot by the electronic still camera of same device type. Therefore, according to the present embodiment, anyone using the electronic still camera 30 can set acquired shooting conditions according to the shooting result while imaging the result.

Although the present embodiment has described a case in which sample image data 140 with charge (realistically, shooting condition data 13c) is downloaded from the image server 10, in the case where the image data is downloaded with free, when the user selects an image to be downloaded (step SA3 in FIG. 6), the contents of the shooting condition data 13c may be displayed at the same time together with image. In addition, even if the downloading is carried out with charge, as in the present embodiment, the shooting condition data 13c can be provided with charge without forcing the user to make wasteful payment by browsing an image that can be downloaded with free.

In addition, although the present embodiment has described a case in which the image server 10 generates sample image data 140 comprising the previously described image data 130b after reduced and the shooting condition data 13c, the original image data 13b before reduced and shooting condition data 13c that are stored in the image data file 13 may be provided to be associated with each other. In that case, both of the data may be recorded in the flash memory 53 of the electronic still camera 30 while the mutual correlation can be checked.

In addition, in the system according to the present embodiment, a sample image displayed on the TFT liquid crystal monitor 32, as described by referring to FIG. 9, is reduced in advance according to the display capacity of the electronic still camera 30 (TFT liquid crystal monitor 32) at the image server 10 side when the sample image is downloaded. Thus, there is no need to generate a sample image according to the display capacity of the TFT liquid crystal monitor 32 of the electronic still camera 30 in advance by means of the personal computer 20 or electronic still camera 30 in which data processing cannot be expected as compared with the image server 10, which is convenient. At the same time, a required time when a sample image is downloaded from the image server 10 is reduced, and communication cost required for downloading is reduced.

In addition, although the present embodiment presents a case in which the personal computer 20 is used as a shooting condition receiving terminal according to the present invention, another communication terminal device can be used as a shooting condition receiving terminal as long as connection to the image server 10 is enabled via a network 1, and image data communication with the electronic still camera 30 is enabled. In that case, such another communication terminal device may not always have a display section for displaying an image transmitted from the image server 10. In addition, communication of image data or the like between such a communication terminal device and the electronic still camera 30 may be communication by means of red infrared rays or wireless communication without being limited to cable 2. Further, in the case where both of the communication terminal device and electronic still camera 30 each have a configuration such that the same removable recording media can be used, there may be provided a configuration such that sample image data 140 or the like is exchanged via such recording media.

In addition, when the previously described electronic still camera 30 is uniquely configured to be connectable to the image server 10 via the network 1, for example, and is configured to have a transmission section or a receiving section for transmitting/receiving data to/from the image server 10, advantageous effect similar to that according to the present embodiment can be provided without using a communication terminal device such as personal computer 20.

SECOND EMBODIMENT

Figure 13:
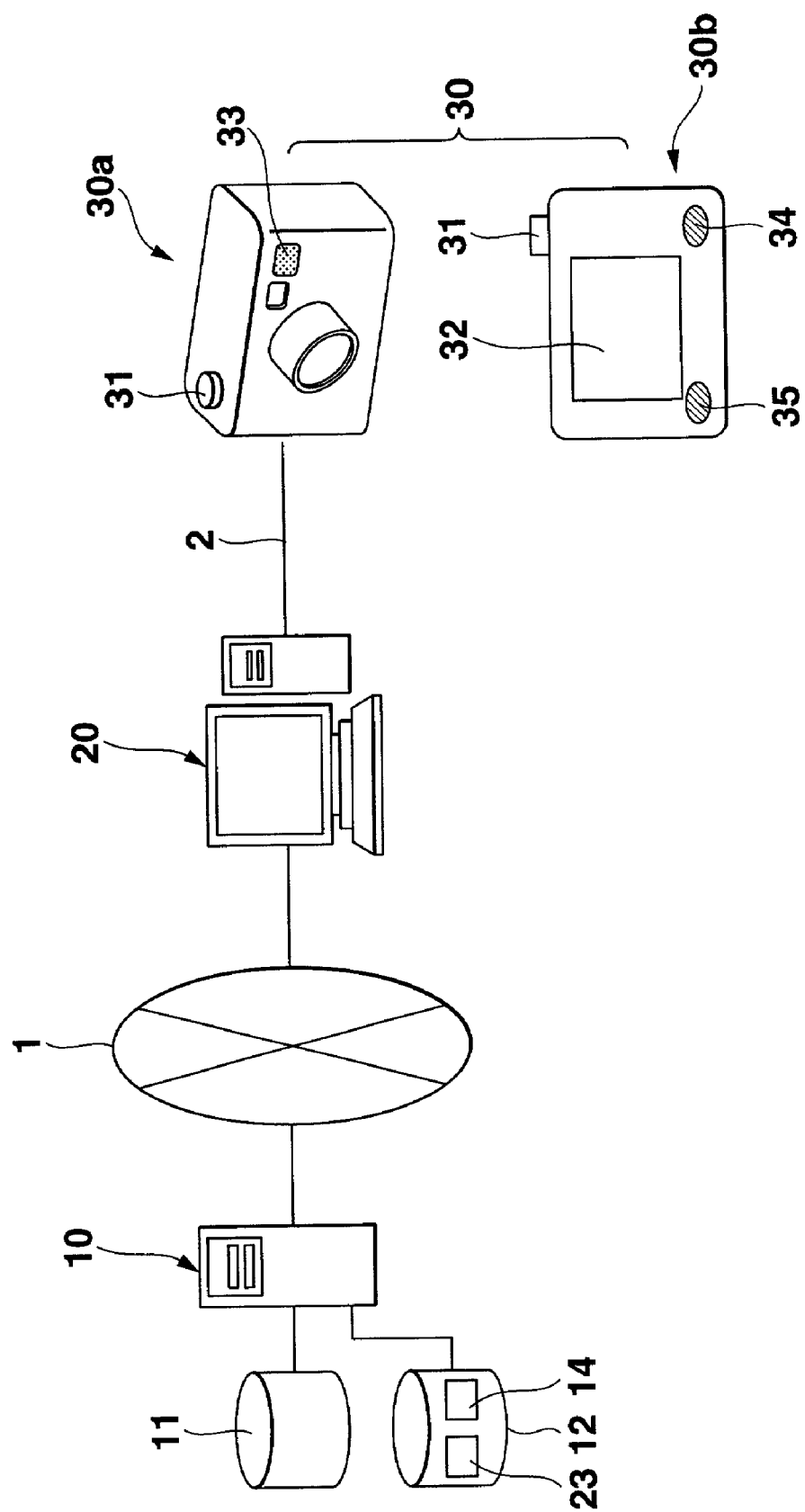
FIG. 13 is a system configuration diagram showing a second embodiment of the present invention.

Now, a second embodiment of the present invention will be described here. FIG. 13 is a configuration diagram of a shooting condition setting system according to a second embodiment of the present invention. This system comprises: an image server 10 connected to via an existing network 1 such as public line network or Internet; a general-purpose personal computer 20; and an electronic still camera 30 interconnected to the personal computer 20 via a cable 2 (for example, predetermined link cable or UBS cable), as in the first embodiment. Hereinafter, like elements similar to those according to the first embodiment are designated by like reference numerals. A duplicate description is omitted here. Primarily, the elements different from those according to the first embodiment will be described in detail.

That is, according to the present embodiment, the data file 12 (storage section) that the previously described image server 10 has comprises a configuration described later, and a program different from that according to the first embodiment is stored in the program file 11. The data file 12 that the image server 10 according to the present embodiment has comprises an image data file 23 shown in FIG. 14 and a set file 14 already described by referring to FIG. 4. The image data file 23 comprises device type name data 23a for specifying an electronic still camera (for example, device type name consisting of alphanumeric or the like); image data 23b on a plurality of images shot in advance by using the electronic still camera; shooting condition data 23c indicating the contends of setting the shooting conditions set in the electronic still camera during shooting of each of these images; and a reduction image data 23d. The reduction image data 23d is image data 23b and reduction images of the stored image. In the present embodiment, the reduction image data denotes thumb nail image data of 320×240 pixels in size, for example.

Here, the image data 23b and reduction image data 23d may be general image data compressed in the JPEG scheme or the like or may be image data available for use in a specific electronic still camera only. Further, in the case where image data 23b is an image file in the JPEG scheme, the reduction image data 23d may be stored as additional data of the image data 23b in the same image file. The contents of the shooting condition data 23c are similar to those according to the first embodiment.

<Operation of Personal Computer and Image Server>

Figure 15:
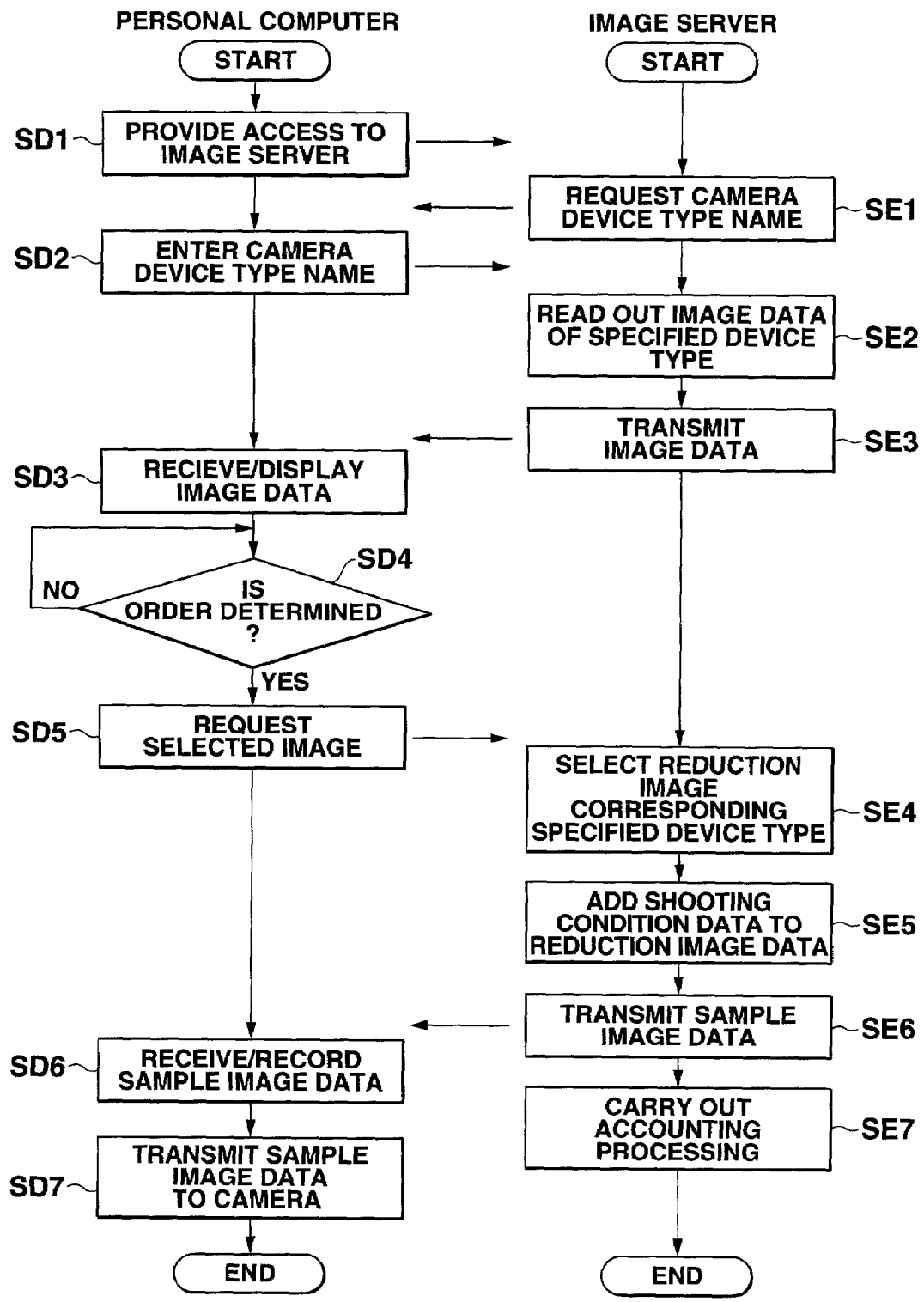
FIG. 15 is a flow chart showing an operation of a personal computer and an image server according to the second embodiment of the present invention.

Now, an operation between a personal computer 20 and an image server 10 when the user of the electronic still camera 30 acquires data for setting the shooting conditions of the electronic still camera 30 from the image server 10 via the personal computer 20, will be described in accordance with a flow chart shown in FIG. 15.

That is, when the personal computer 20 provides an access to the image server 10 (such as download site of image data) with the user operation (step SD1), the image server 10 requests a camera device type name (step SE1). The personal computer 20 prompts the user to enter a device type name, and transmits the entered device type name data to the image server 10 (step SD2). Here, although it is assumed that the user entered device type name data is transmitted to the image server 10, for example, at the step SE1, the image server 10 transmits all device type name data 14a registered in the previously described set file 14 to the personal computer 20, the personal computer 20 displays a device type name list or the like on the screen, and causes the user to select any device type name so that the selected device type name data may be transmitted to the image server 10.

Then, the image server 10 reads out a plurality of image data 23b stored in advance in the image data file 23 based on the transmitted device type name data (step SE2), and transmits them to the personal computer 20 (step SE3).

In addition, at this time, a plurality of image data transmitted by the image server 10 to the personal computer 20 may be reduction image data 23d because the device type name is identified. A small data capacity will suffice, and thus, a short transfer time and a small receiving memory space will suffice. For example, this reduction image data is effective in the case where the capacity of a memory such as electronic still camera 30 having a communication function, for example, is limited. The personal computer 20 displays on the screen an image based on each of the received images 23b (step SD3). At this time, on the screen, as in the first embodiment, for example, a predetermined image order screen 100 as shown in FIG. 10 is displayed. When the user selects one or plural images, and an order button 100b is clicked (YES at the step SD4), the personal computer 20 transmits to the image server 10 specific information such as image number or data name for specifying the selected image, and requests the image (step SD5). In the case where a cancel button 100c is clicked instead of an order button 100b, processing for returning to the step SD2 or the like is carried out.

Next, the image server 10 selects reduction image data 23d (thumb nail image data) stored in advance the image data file 23, the reduction image data corresponding to image data 23b in one of plural required images 23b (step SE4). Further, the corresponding shooting condition data 23c thereto is added to the reduction image data 23d, and sample image data 150 that is transmission image data of the present invention, comprising reduction image data 23*d* and shooting condition data 23*c,* is generated as shown in FIG. 15 (step SE5).

Figure 16:
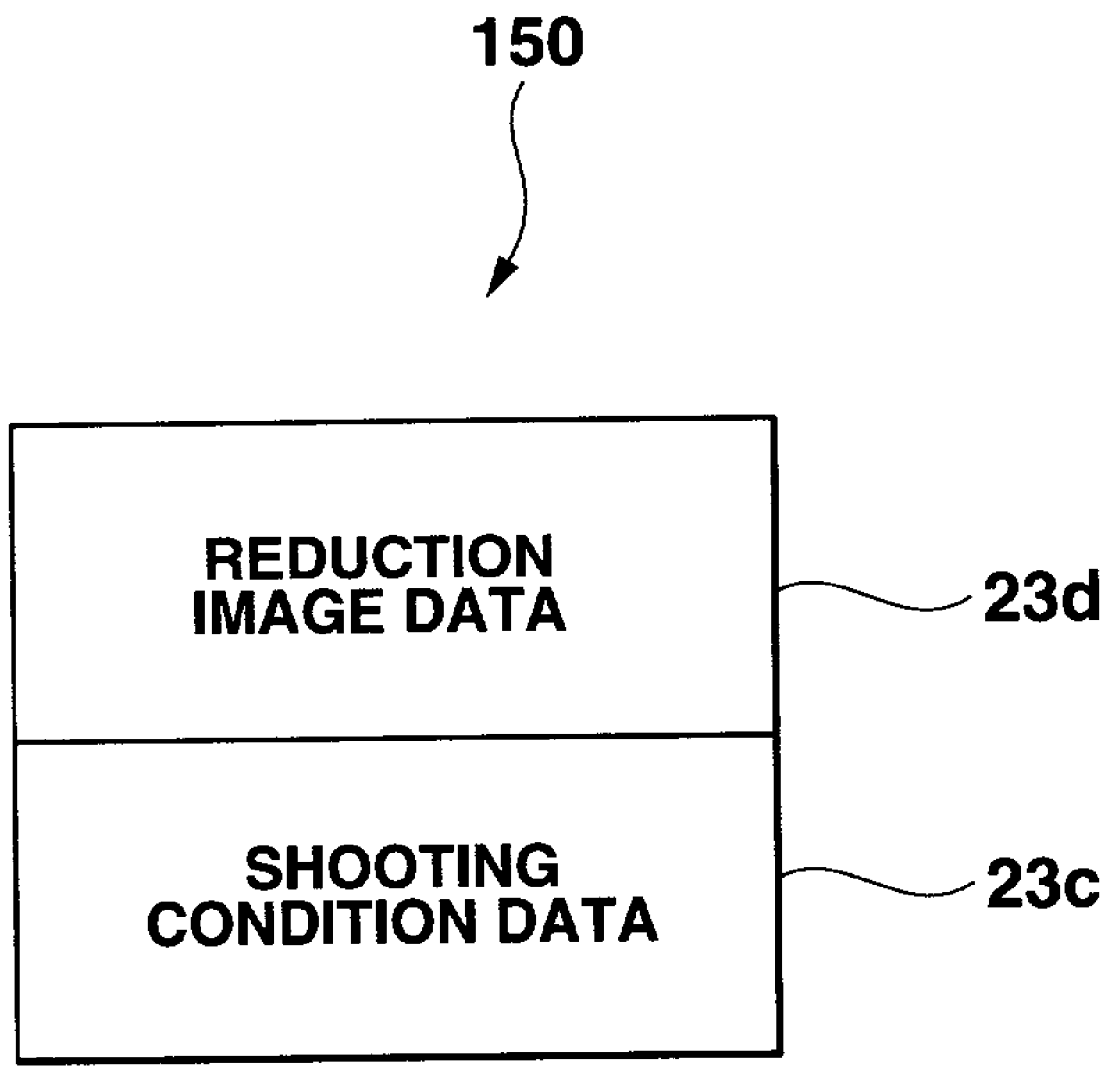
FIG. 16 is a conceptual view showing a configuration of sample image data according to the second embodiment of the present invention.

When reduction image data 23*d* is selected (searched) at the step SE4), in the case where image data 23*b* is an image file in the JPEG scheme, and reduction image data 23*d* is stored as additional data of the image data 23*b* in the same image file, as described previously, processing for extracting only the reduction image data 23*d* from the corresponding image file is carried out. In addition, in FIG. 16, although sample image data 150 is conceptually shown, in the case where the sample image data 150 is an image file in the JPEG scheme, for example, the reduction image data 23*d* (encode data) and the shooting condition data 23*c* are stored in a region other than this image data storage region that a predetermined user can use freely.

Then, one or plural items of generated sample image data 150 is transmitted to the personal computer 20 (step SE6), and then, predetermined accounting processing is carried out for the user of the personal computer 20 at this time (step SE7). Thereafter, the personal computer 20 receives the sample image data 150 from the image server 10, and stores the data in a hard disk (step SD6). Then, the user initiates the previously described link program, and carried out predetermined transmission operation, whereby the sample image data 150 stored in the hard disk is transmitted to the electronic still camera 30 (step SD7). In this manner, one or plural items of sample image data 150 downloaded from the image server in the previously described procedures are recorded in a sample image recording region 53*b* allocated in the flash memory 53 of the electronic still camera 30.

Therefore, in the present embodiment as well, advantageous effect similar to that according to the previously described first embodiment can be provided. In addition, the previously electronic still camera 30 is configured so as to be connectable to the image server 10 via the network 1 uniquely, for example, i.e., is configured to have a transmission section or a receiving section for transmitting/receiving data to/from the image server 10, whereby advantageous effect similar to that according to the present embodiment can be provided without using a communication terminal device such as personal computer 20. The present embodiment is similar to the first embodiment in another respect, for example, in that a communication terminal device other than the personal computer 20 may be a shooting condition receiving terminal of the present invention.

THIRD EMBODIMENT

Now, a third embodiment of the present embodiment will be described here. According to the present embodiment, in the system described in the second embodiment, programs for causing each device to carry out operations described below are recorded in a program file 11 of an image server 10, a storage section 22 of a personal computer 20, and a ROM 54 of an electronic still camera 30, respectively.

<Operation of Electronic Still Camera>

Figure 17:
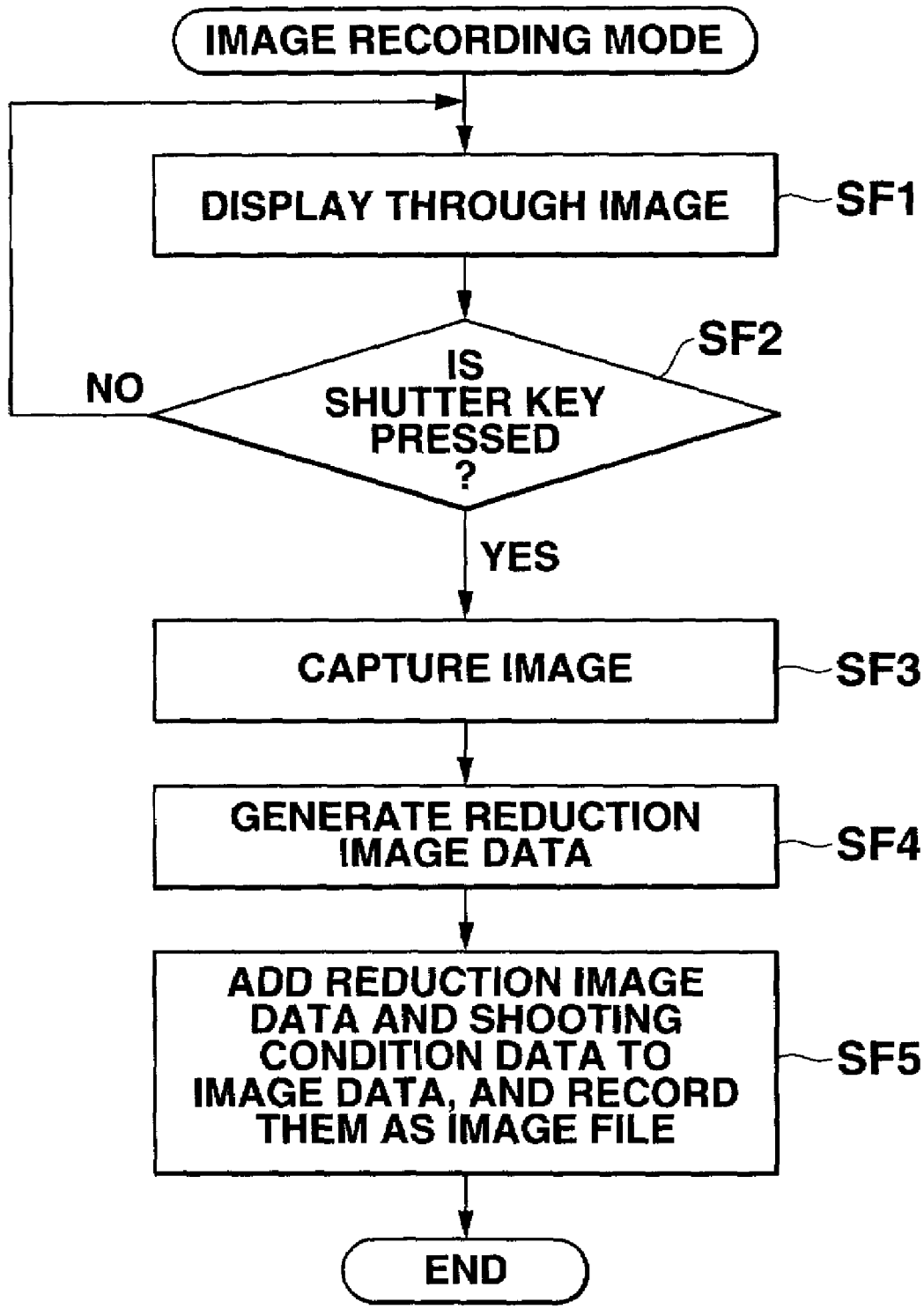
FIG. 17 is a flow chart showing an operation in an image recording mode of an electronic still camera according to a third embodiment of the present invention.
Figure 18:
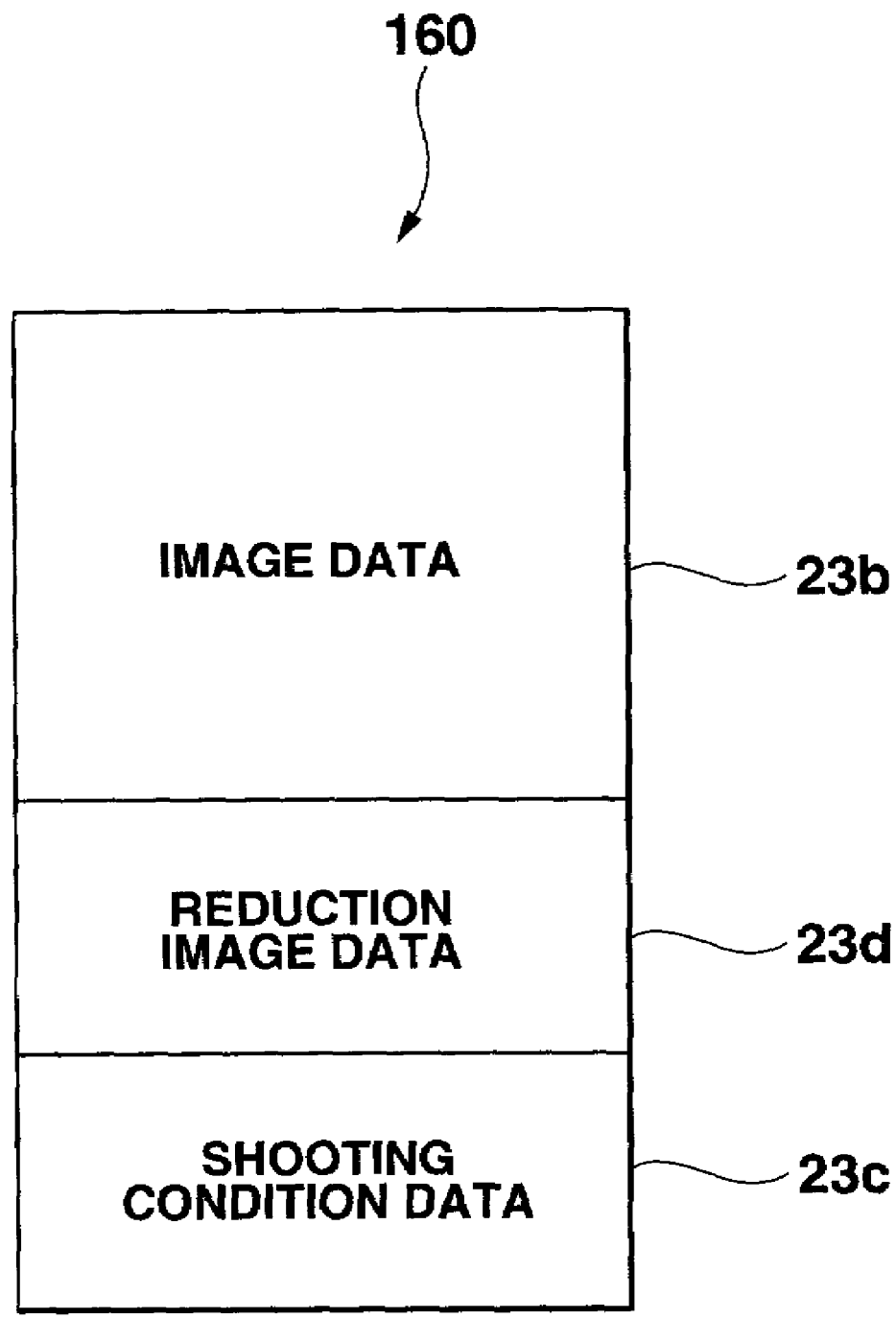
FIG. 18 is a schematic view showing a configuration of image file data stored in an image recording mode by the electronic still camera according to the third embodiment of the present invention.

FIG. 17 is a flow chart showing an image recording mode operation in an electronic still camera 30. When an image recording mode is set, the electronic still camera 30 enters a shooting standby state in which a through image is displayed on a TFT liquid crystal monitor 32 (step SF1). When a shutter key 31 is pressed (YES at the step SF2), an image is captured from a CCD 41 (step SF3), and the captured image is compressed and a reduction image of the shot image is produced (step SF4), and the reduction image data 23*d* (data on thumb nail image of 320×240 pixels in size, for example, in the present embodiment) and the shooting condition data 23*c* comprising shooting condition setting parameters (such as shutter speed or diaphragm value) during shooting are added to the compressed image data 23*b,* as shown in FIG. 18. Then, the added data is recorded as an image file 160 in a predetermined format scheme, for example, the JPEG scheme in the shooting image recording region 53*a* of the flash memory 53 (step SF5), whereby one shooting operation is completed.

<Operation of Electronic Still Camera and Personal Computer>

FIG. 19 is a flow chart showing an operation concerning data transfer between an electronic still camera 30 and a personal computer 20 when the user of an electronic still camera 30 uploads an image file 160 recorded in the previously described image recording mode on an image server 10 via the personal computer 20.

That is, when the user connects the electronic still camera 30 and personal computer 20 to each other via a predetermined link cable, and a transfer mode is set to the electronic still camera 30 (YES at the step SH1), the electronic still camera 30 delivers a communication establishment command signal to the personal computer 20 (step SG2). When the personal computer 20 receives the above signal (YES at the step SH1), the computer initiates link software, delivers a communication establishment response signal to the electronic still camera 30, and enters a data receiving standby state (step SH2).

When the electronic still camera 30 receives the communication establishment response signal (YES at the step SG3), the camera transfers all the image files 160 stored in a shooting image recording region 53*a* of a flash memory 53 to the personal computer (step SG4). After transfer of all the image files 160 has been completed (YES at the step SG5), a transfer completion notification signal is delivered at that time (step SG6), and operation in the transfer mode is terminated. In this duration, the personal computer 20 receives the image files 160 from the electronic still camera 30, and stores the received image files 160 in order in a hard disk (step SH3). When the transfer completion notification signal has been received (step SH4), data receiving standby state caused by the link software is terminated immediately.

<Operation of Personal Computer and Image Server>

FIG. 20 is a flow chart sowing an operation between a personal computer 20 and an image server 10 when an image file 160 transferred to a personal computer 20 is uploaded on an image server 10 in accordance with the previously described procedures.

That is, when the personal computer 20 provides an access to the image server 10 (such as download site of image data) with the user operation (step SI1), the image server 10 requests a camera device type name (step SJ1). Concurrently, the personal computer 20 prompts the user to enter a device type name, and transmits the entered device type name data to the image server 10 (step SI2). Then, the image server 10 temporarily stores the transmitted device type name data (step SJ2), and transmits data displayed on an upload acceptance screen to the personal computer 20 (step SJ3).

The personal computer 20 displays a predetermined upload acceptance screen based on the received data (step SI3), and causes the user to select an image file 160 to be uploaded from such screen (step SI4). At this time, selection operation is made by listing on the screen a reduction image (thumb nail image) contained in the image file 160 stored in a predetermined place in a hard disk by a transfer operation described by referring to FIG. 19, for example, and causing the user to select one or plural, or alternatively, all images by predetermined key operation in the screen. Then, when the user makes transmission operation after selection operation (YES at the step SI5), one or plural selected image files 160 are transmitted to the image server 10 (step SI6). This transmission is continued until transmission of all the selected files has been completed (NO at the step SI7). Upload operation is terminated at a time when transmission of all the files has been completed (YES at the step SI7).

Figure 14:
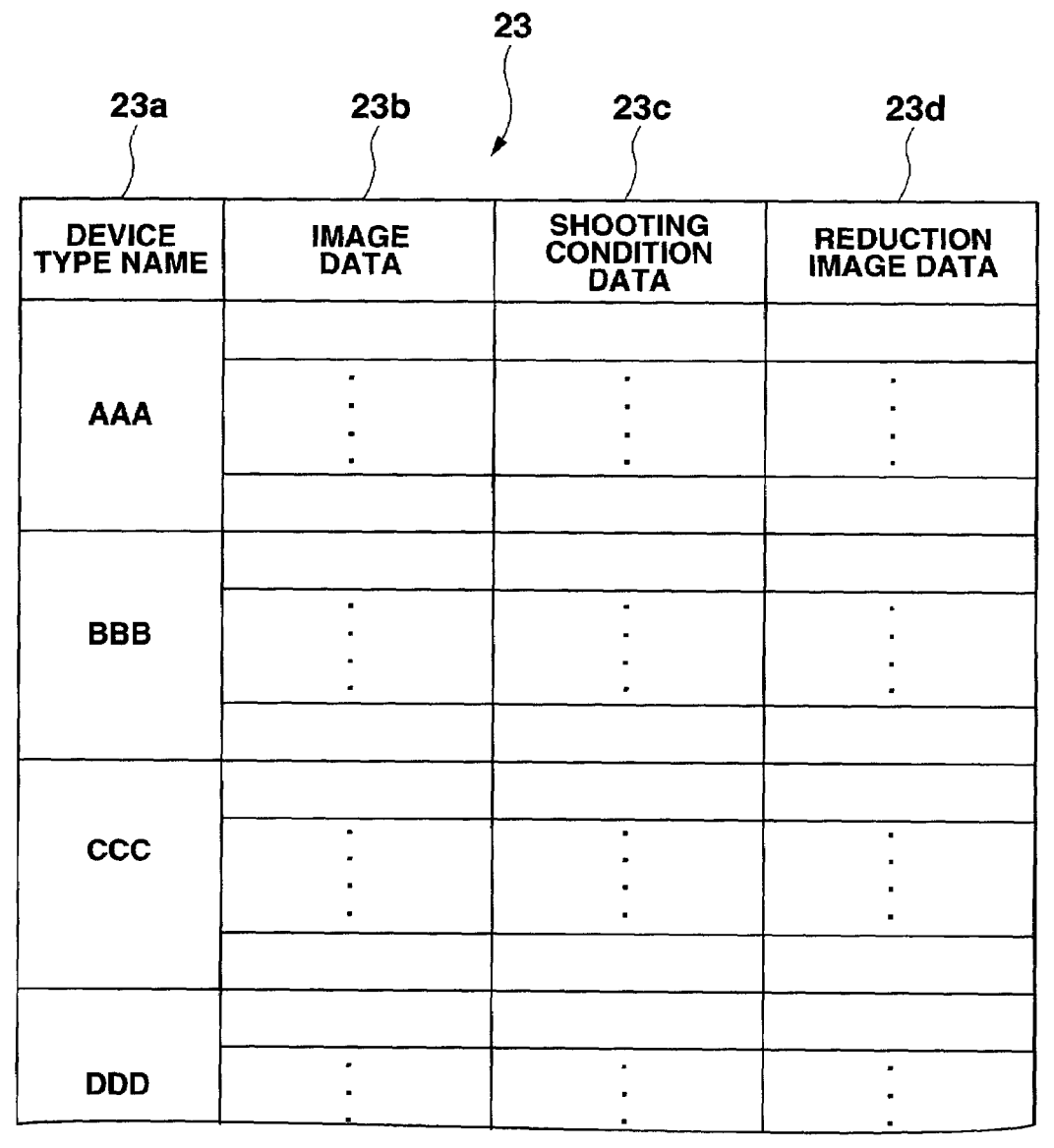

In addition, at the image server 10, image files 160 delivered from the personal computer 20 are sequentially received (step SJ4), and each item of data configuring the received image file 160, i.e., image data 23b, reduction image data 23d, and shooting condition data 23c are associated with device type name acquired at the step SJ2, and associated data is stored in an image data file 23 shown in FIG. 14 (step SJ5). Then, at a time when receiving processing of all the image files delivered from the personal computer 20 has been completed (YES at the step SJ6), one upload acceptance operation is terminated.

Therefore, in the present embodiment, as described in the first and second embodiments, anyone using the electronic still camera 30 can set proper shooting conditions according to the shooting result while imaging the shooting result. In addition, when the own shot image and the shooting conditions set in the electronic still camera 30 when the image is shot are stored in the image server 10, the own shot image data or the like can be used by another person. Images can be exchanged between a plurality of persons. As a result, a manager of image data download site or the like can easily provide a variety of data to the image server 10.

Although the present embodiment describes a case in which, in uploading the image file 160 shown in FIG. 20, the image server 10 requires the personal computer 20 (accessing person) to enter a camera device type name, and an accessing person makes input operation for the device type name, for example, in the case where the electronic still camera 30 has a function for adding its own device type name data to the image file 160 during shooting, it causes the image server 10 to automatically judge the camera device type name from the received image file 160. In addition, although a description has been given with respect to a case in which the electronic still camera 30 records image data 23b of an image shot in an image recording mode as an image file 160, and the reduction image data 23d and shooting condition data 23c are added to the image data 23b, in the case where the electronic still camera 30 is configured to additionally store each item of data 23b, 23c, and 23d during shooting, these items of data 23b, 23c, and 23d may be transferred and uploaded in batch during transfer described in FIG. 19 and during upload described in FIG. 20.

With respect to upload of the image file 160 or the like described above, the electronic still camera 30 is configured so as to be connectable to the image server 10 via the network 1 uniquely, for example, i.e., is configured to gave a transmission section and a receiving section for transmitting/receiving data to/from the image server 10, only the electronic still camera 30 can upload the image file without using a communication terminal device such as personal computer 20.

What is claimed is:

1. A shooting condition providing apparatus which is accessible via a network, said apparatus comprising:

a storage section configured to store images as data and shooting condition setting information which is associated with the images and which indicates shooting conditions of the associated images to enable a camera device to set the shooting conditions;

a reducing section configured to reduce to a predetermined transmission size at least specified ones of the images stored in the storage section;

a transmission section configured to transmit data to a shooting condition receiving terminal; and a control section configured to cause the transmission section to transmit the images stored as data in the storage section to the shooting condition receiving terminal, to cause the reducing section to reduce at least one of the images that is specified by the shooting condition receiving terminal, and to cause the transmission section to transmit the reduced at least one specified image and the associated shooting condition setting information to the shooting condition receiving terminal after the shooting condition setting information has been added to the reduced at least one specified image.

2. The shooting condition providing apparatus according to claim 1, wherein the predetermined transmission size is determined in accordance with an image displaying function of a display of the camera device.

3. The shooting condition providing apparatus according to claim 1, further comprising an information adding section configured to add the shooting condition setting information stored in the storage section to the reduced specified images associated therewith.

4. The shooting condition providing apparatus according to claim 1, further comprising a receiving section configured to receive, from the shooting condition receiving terminal, specifying information to specify the at least one specified image stored as data in the storage section.

5. The shooting condition providing apparatus according to claim 1, further comprising an accounting processing section configured to carry out accounting processing for a user of the shooting condition receiving terminal, as the transmission section transmits the shooting condition setting information to the shooting condition receiving terminal.

6. The shooting condition providing apparatus according to claim 1, wherein the shooting condition receiving terminal comprises a receiving section configured to receive the reduced at least one specified image and the associated shooting condition setting information transmitted by the transmission section;

wherein the camera device comprises a camera device main body which is capable of communicating with the shooting condition receiving terminal to obtain the reduced at least one specified image and the associated shooting condition setting information, and which is configured to shoot and record images of an object, said camera device main body comprising:

a terminal side storage section configured to store as data the reduced at least one specified image and the associated shooting condition setting information obtained from the shooting condition receiving terminal;

a display section configured to display the at least one image stored as data in the terminal side storage section; and a setting section configured to set the shooting conditions at a time of shooting, based on the shooting condition setting information stored in the terminal side storage section.

7. A shooting condition providing method operable over a network, said method comprising: storing images as data and shooting condition setting information which is associated with the images and which indicates shooting conditions of the associated images to enable a camera device to set the shooting conditions; causing the stored images to be displayed for a user of the camera device to enable the user to select at least one desired image from the displayed images; reducing the at least one selected image to a predetermined transmission size; reading out the shooting condition setting information stored in association with the at least one selected image; and transmitting to the camera device the read-out shooting condition setting information and the reduced at least one selected image in association with each other after the shooting condition setting information has been added to the at least one reduced selected image.

* * * * *